May 12, 1953 W. HEUSSER 2,638,391
PISTON FOR INTERNAL-COMBUSTION ENGINES
Filed Feb. 13, 1950 2 Sheets-Sheet 1
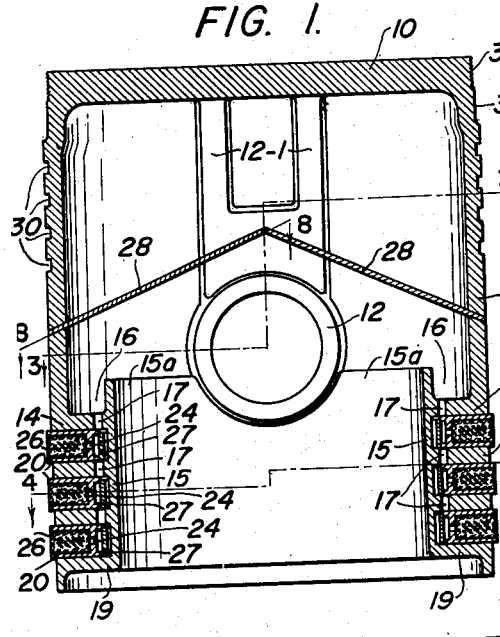
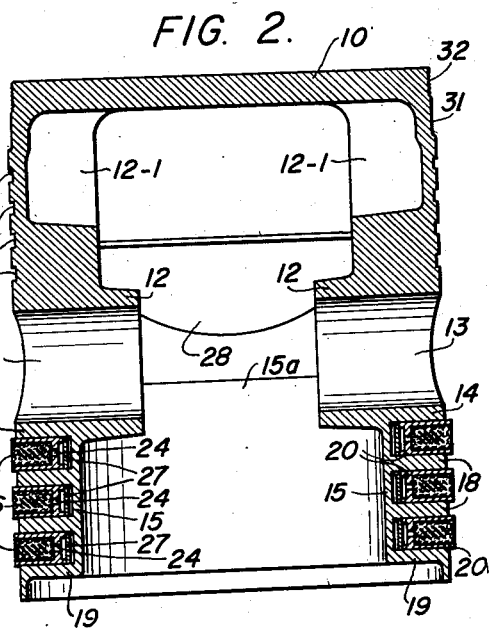
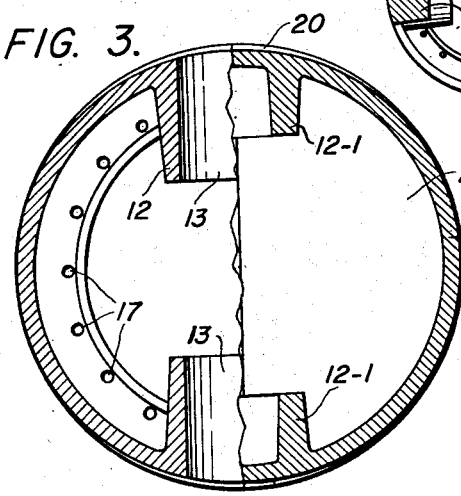
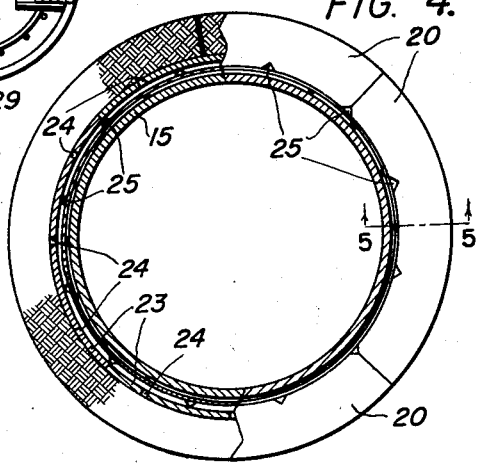
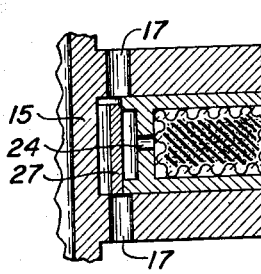
Inventor:
Wilfrid Heusser,
Attorneys.

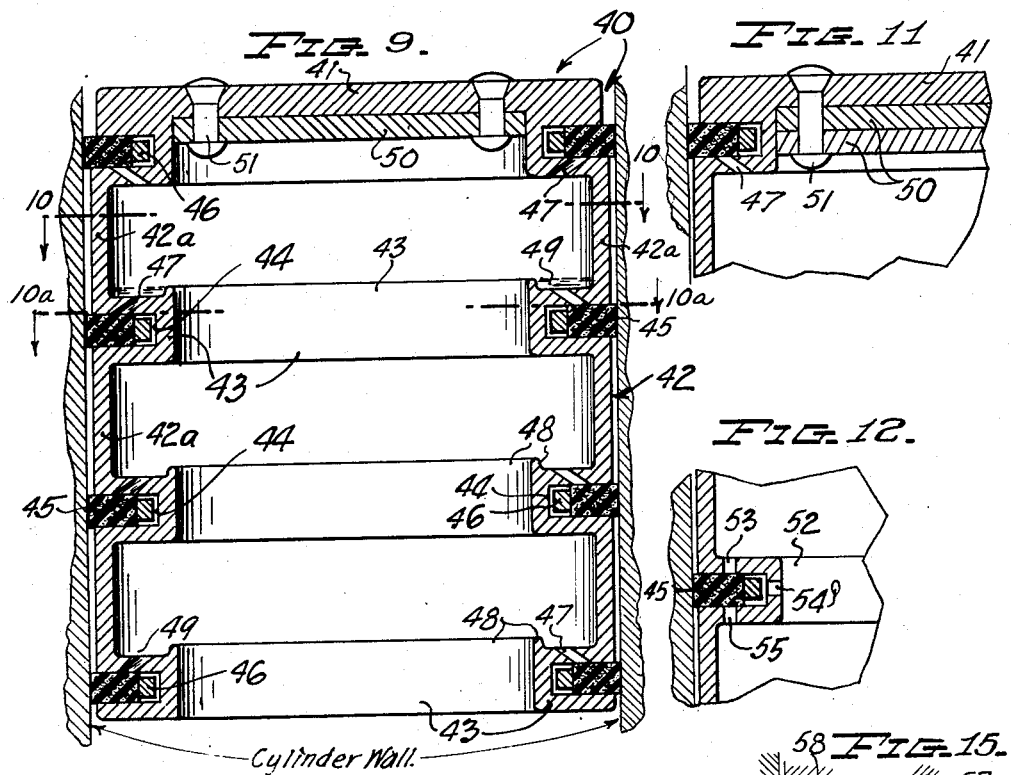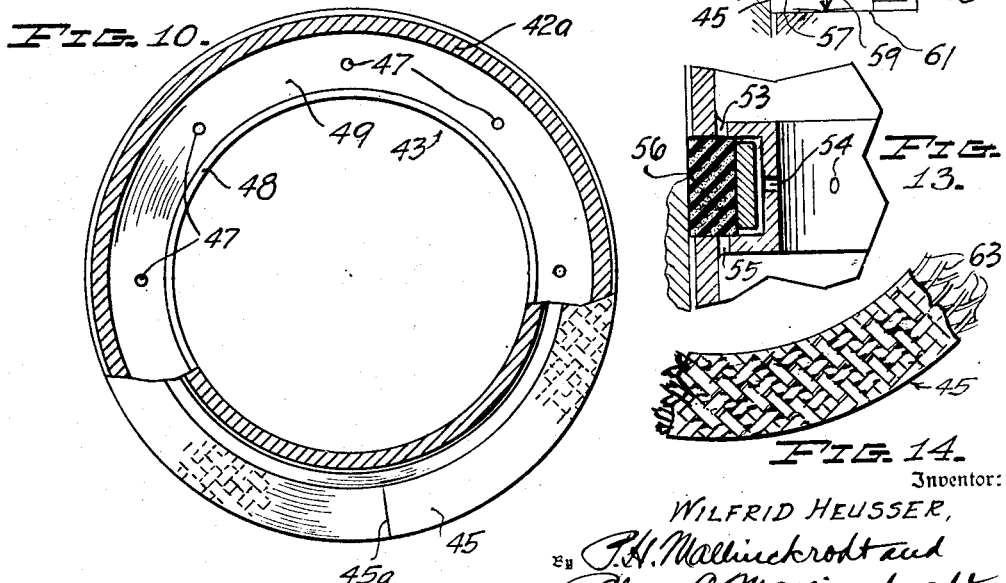

Patented May 12, 1953

2,638,391

UNITED STATES PATENT OFFICE 2,638,391

PISTON FOR INTERNAL-COMBUSTION ENGINES

Wilfrid Heusser, Salt Lake City, Utah

Application February 13, 1950, Serial No. 144,007

15 Claims. (Cl. 309—7)

This invention relates to pistons of the type operable within cylinders of internal combustion engines.

In accordance with my invention, a unique structural combination is utilized for attaining superior lubrication of the piston and piston rings within a cylinder of an internal combustion engine, the principal feature of such construction being the combination of wick-type piston rings with ring-receiving recesses formed within the piston skirt, advantageously in the lower portion thereof, in communication with the interior of the piston. Constant absorption of oil by the piston rings and a wiping lubrication of the cylinder walls during operation of the engine, together with oil retention by such piston rings during engine inactivity, insure thorough and proper lubrication at all times, including the critical phase of engine starting.

I have found, however, that with certain modern types of internal combustion engine pistons which are not perfectly cylindrical, that is to say, pistons which are somewhat elliptical transversely of their lengths, difficulties are encountered with the relatively soft, wick-type piston rings. Such piston rings have a tendency to bulge into those clearances established between the piston and cylinder walls by reason of the mutually different curvatures thereof, leading to early disintegration of the rings.

It is a specific object of the invention to correct this difficulty, and to thereby render the advantageous features of my invention applicable to internal combustion engine pistons which are somewhat elliptical transversely of their lengths.

Other specific objects are:

To firmly contain a wick-type piston ring against bulging during operation.

To accomplish the above, while providing for free interflow of oil between the hollow interior and the exterior of the piston.

In attaining these specific objects I provide a rigid piston ring carrier, which is truly annular in formation and conforms exactly with the cylindrical bore of the cylinder within which the piston works. Such piston ring carrier is preferably made up of a plurality of arcuate segments, which fit within a piston-ring-receiving recess of the piston skirt. Further, the carrier is formed to provide adequate passage for oil between the piston ring proper and oil-supply openings leading from the hollow interior of the piston.

Another specific object of the present invention is to prevent spray oil from reaching deeply into the hollow interior of the piston and into contact with excessively hot portions thereof when the conventional wrist pin joinder between piston and connecting rod is employed, and to direct collection of such spray oil where it will be most effective in charging the wick-type piston rings with lubricant.

This is accomplished by the provision of sloping ceiling-like inserts within and intermediate the length of the hollow piston above the wrist pin joinder.

Further objects and features of the invention will be apparent from the following detailed description of the several embodiments illustrated in the accompanying drawings to exemplify the inventive concepts hereinafter claimed.

In the drawings:

Fig. 1 represents a vertical section taken through a preferred specific embodiment of the invention utilizing a slightly elliptical piston, the section extending longitudinally through the piston along the long or principal axis of the elliptical formation and at right angles to the short axis;

Fig. 2, a vertical section corresponding to that of Fig. 1, but taken along the short axis of the elliptical formation, that is to say, along the wrist pin axis of the piston;

Fig. 3, a partially offset horizontal section taken along the line 3—3 of Fig. 1;

Fig. 4, a similar section taken along the line 4—4 of Fig. 1;

Fig. 5, a fragmentary vertical section taken on the line 5—5 of Fig. 4 and drawn to a considerably enlarged scale;

Fig. 6, a plan view of one arcuate segment of the piston ring carrier, drawn to a scale between that of Fig. 5 and the other figures;

Fig. 7, an inside elevation of such segment;

Fig. 8, a fragmentary section taken on the line 8—8 of Fig. 1 and drawn to a reduced scale;

Fig. 9, a vertical, axial section taken through a more general embodiment of the invention, wherein the walls of the cylinder in which the piston is positioned are illustrated fragmentarily, the piston being truly cylindrical in formation and drawn to a scale somewhat enlarged over that of the preceding figures;

Fig. 10, a view in composite horizontal section, showing fragmentary transverse sections taken substantially on the lines 10—10 and 10a—10a, respectively, in Fig. 9, the former appearing in the upper part of the view and the latter in the lower part;

Figs. 11, 12, and 13, fragmentary portions of Fig. 9, illustrating different constructions of details;

Fig. 14, an enlarged detail view, in plan, illustrating a fragment of a suitable form of wick-type piston ring; and Fig. 15, an action diagram.

Referring to the drawings:

The illustrated piston of Figs. 1 through 8 is of the type which is somewhat elliptical transversely of its length, as appears in Figs. 3 and 4. It is made up in general, as is customary, of a piston head 10 and a depending circumferential skirt 11. The hollow interior of the piston is open to splash lubrication from the lower open end of the skirt 11. Intermediate the length of the piston are the customary internally-extending bosses 12, which are bored at 13 to provide bearings for the usual wrist pin connection with a piston connecting rod (not shown). Struts 12—1 extend between bosses 12 and the piston head 10.

In accordance with the generic aspects of my invention a plurality of annular receiving recesses for piston rings are formed within the lowermost portion of the piston skirt 11. In the illustrated instance, such receiving recesses, indicated 14, extend internally of the piston within an annular housing 15 formed as an integral part of the piston skirt 11. The inner wall of such housing 15 projects upwardly a suitable distance, as at 15a, to provide an internal, annular cup 16 immediately above the housing proper, for the purpose of maintaining a reservoir of lubricating oil.

The ring-receiving recesses 14 are advantageously considerably deeper, considered radially of the piston, than they are wide, considered longitudinally of the piston skirt, thereby providing extended bearing surfaces for the piston ring carriers.

The housing 15 is perforated at intervals around its circumferential extent by small passages 17 which extend downwardly from the bottom of the oil reservoir 16 through the series of ring-receiving recesses. Such passages are conveniently provided by drilling upwardly through the several transverse webs 18 of the housing. The bottom set of passages so produced are then plugged, as at 19. Thus, sets of openings are provided which establish oil-flow communication of the ring-receiving recesses 14 with the interior of the piston, and particularly with the oil reservoir 16.

Whereas in the instance of the more general embodiment of my invention illustrated in Figs. 9 through 15 hereof, relatively soft, wick-type piston rings are fitted directly into the ring-receiving recesses, such piston rings are, in this special embodiment, fitted within respective rigid ring carriers, which are, in turn, fitted within the ring-receiving recesses.

As illustrated in Figs. 6 and 7, the ring carriers are preferably made up of a series of individual, rigid, arcuate segments 20, which are assembled end-to-end. Each of the segments 20 has an outer piston-ring-receiving channel 21 and an inner channel 22, the two channels being separated by a wall 23. Such wall 23 is perforated at intervals around its length by means of oil-flow passages 24, thereby enabling oil to seep between the outer and inner channels 21 and 22, respectively. Further, the arcuate inner edges of each segment 20 are notched, as at 25, to provide for flow of oil between the inner channels 22 and the interior of the piston, by way of passages 17.

As laid end-to-end within a receiving recess 14, such arcuate segments 20 form a truly circular piston ring carrier, which conforms exactly to the customary true cylindrical formation of an engine cylinder, and serves to receive and to contain against bulging, a relatively soft, wick-type, piston ring 26 made, for example, of braided soft-metal wire as set forth in my copending patent application Serial No. 83,846, filed March 28, 1949, and entitled "Piston Ring Assembly for the Pistons of Internal Combustion Engines."

The ring carriers preferably fit snugly within the respective receiving recesses 14, and are backed by respective resilient expander rings 27. In each instance the expander ring 27 bears against the inside flanges which define the inner channel 22 of the ring carrier, exerting outwardly directed pressure thereagainst. Thus, such inner channel 22 is left free for the interflow of oil between passages 17 and 24, and, further, for the flow of oil from the upper tier of passages 17 down through the lower tiers thereof.

In order to prevent spray oil which enters the hollow interior of the piston through the lower open end of the piston skirt 11, from penetrating deeply into the interior of the piston and from coming in contact with the excessively hot under-surface of the piston head 10 and adjoining excessively hot inner surfaces of the piston skirt, a pair of ceiling plates 28 are slidably positioned within receiving slots 29, Fig. 8, appropriately formed through opposing portions of the piston skirt 11. Such ceiling plates 28 slope upwardly from the circumference of the piston skirt to a meeting along a central ridge line lying above the bosses 12 and above and parallel to the wrist axis. Thus, the ceiling plates 28, form, in effect, a vaulted ceiling across the entire hollow interior of the piston, with the ridge line being above and extending parallel with the wrist pin axis, and the lower edges lying above the annular oil reservoir 16. Spray oil which normally would reach deeply into the hollow interior of the piston is deflected by the ceiling plates 28 into the reservoir 16.

It should be noted that, as illustrated in Fig. 8, the slots 29 do not extend through the struts 12—1, nor through portions of the piston skirt adjacent thereto. Accordingly, the slots 29 do not effect a separation of the upper portion of the piston from the lower portion thereof.

In operation, splash oil is thrown against the exposed cylinder walls on the upstroke of the piston, and is wiped clear by the piston rings 26 on the downstroke of the piston. Since the piston rings are concentrated in the lowermost portion of the piston skirt, they are out of the zone of excessive heat. Also, they traverse substantially no part of the cylinder walls which have not been acted upon directly by oil spray. This is contrary to the condition existing where piston rings are concentrated in the uppermost portion of the piston skirt in accordance with conventional practice. Furthermore, since the piston rings 26 absorb a certain amount of such spray oil due to their porous nature, and also act as wicks to distribute oil from the reservoir 16 against the cylinder walls, a thorough wiping lubrication of the cylinder walls is assured at all times.

The retention of oil by the wick-type piston rings and by the reservoir 16 when the engine is not operating is particularly important in guarding against scoring of the cylinder walls upon starting of the engine.

The upper portion of the piston skirt is preferably grooved circumferentially to provide a series of annular, oil-retaining channels 30, which aid in lubricating the upper portion of the cylinder walls. It is not always necessary to provide such channels 30, for the piston rings and oil film provided thereby are the primary sources of lubrication.

An annular recession 31 about the uppermost portion of the piston, and the provision of a series of small, annular serrations 32 for anchoring carbon that tends to form thereat, are features which are preferably employed in addition to the unique construction aforedescribed. Such serrations advantageously cover an annulus substantially equal in width to the thickness of the piston head 10, so that the anchored carbon soon builds up an additional seal against oil creeping into the combustion chamber portion of the cylinder.

While this particular construction is particularly applicable to pistons which are somewhat eliptical transversely to their lengths, it may be also applied to advantage in connection with truly cylindrical pistons.

A more general construction is, however, illustrated in Figs. 9 through 15, wherein no separate carriers are employed for the oil-absorbent or wick-type piston rings.

There, the numeral 40 indicates the body of the piston, which is composed of the head 41 and the skirt 42, the latter preferably having thin walls 42a. The fact that the walls can be made relatively thin is rendered possible by the provision of inwardly extending, annular housings 43, which are circumferentially grooved or channeled, as at 44, to receive the oil-absorbent piston rings 45 and the resilient expansion rings 46.

The piston rings 45, see especially Fig. 14, may be constructed of a braided fabric, such as asbestos intimately associated with an oil-conditioned graphite filler, and reinforced by fine metallic wire or textile threads 63, if desired, but are preferably constructed in accordance with the disclosure of my afore-referred-to patent application Serial No. 83,846. In this particular instance, the piston rings are of an unusual cross-section, in that the dimension radially thereof (and therefore transversely of the cylinder) is appreciably greater than is customary in piston rings of conventional types. The purpose of this is to provide an ample transverse bearing area in the respective grooves 44, so that the tendency of a ring to become loose in its housing 43 is practically eliminated.

Furthermore, the extent of the transverse annular area of each ring housing is sufficient to accommodate a plurality of circumferentially spaced oil holes 47, disposed to provide passages for splash oil from the interior of the piston to the piston ring, these holes being shown in this instance as located in the upper walls of the channel 43. At the inner edge of each ring housing is a raised edge portion 48 that serves to define a depression or trough 49 which functions as a miniature oil or lubricant reservoir. The outer circumference of the piston head 41 is somewhat smaller than the circumference of the main body of the piston, so as to provide clearance in a manner that is common practice.

As illustrated, this piston assembly is arranged for use with the connecting rod assembly of my Patent No. 2,513,023, granted June 27, 1950, and entitled "Piston and Connecting Rod Assembly." Accordingly, the piston head 41 is constructed so as to accommodate the cradle foundation plate assembly 50, which is connected to the piston head as by means of rivets 51.

The structural characteristics of the rings 45 are such that the ends thereof, as at 45a, can be tightly squeezed together, making it desirable that the rings initially are somewhat larger than the diameter of the cylinder. This assures complete circumferential contact between the ring and the cylinder wall. In this connection it should be noted that these rings are porous and essentially similar to packing, and might be said to be made up of packing material.

In operation, oil feeds from the reservoir through holes 47 directly onto a bearing area of the corresponding ring, and, because of the capillary properties of the wick-type or oil-absorbent ring structure, the oil reaches substantially every part of the bearing areas.

It is to be observed that the expansion rings 46 serve not only to exert a radially expansive stress on the rings 45 to press them against the cylinder wall, but, considering that such rings are flexible and somewhat resilient, although firm in structure, they also act to bulge the rings axially of the piston, thereby causing them to bear axially against the opposing tranverse faces of the channels in the housings 43. This is indicated in Fig. 15, where the arrows 57 indicate the force exerted by the expansion ring 46, and the arrows 58 and 59 the resulting forces acting against the channel faces 60 and 61, brought about because of the yieldable property of the piston ring 45.

While the preferred cross-section of the ring is shown in Figs. 9, 11, and 12, where the axial dimension is considerably less than the transverse dimension, it is possible to secure excellent results even where the dimensions are reversed, as in Fig. 13.

In adapting the invention to engines of radial type and the like, where the reservoir trough of Fig. 9 could have no utility, the ring-receiving, annularly channeled housings are constructed as illustrated at 52 in Figs. 12 and 13. There, oil holes 53, 54, and 55 are spaced circumferentially of the channel, and extend through the upper, inner, and lower walls, respectively, of such housings, thereby making it possible for the oil that has splashed at random through the inside of the piston to reach every part of the piston ring 45, in Fig. 12, and the piston ring 56, in Fig. 13.

The wick-type, oil-absorbent piston rings mentioned hereinabove as being set forth in detail in my copending application Serial No. 83,846, are claimed per se in that application.

While Figs. 9 and 11 illustrate a construction wherein the ring-receiving, annular housings and the wick-type or oil-absorbent piston rings are distributed throughout the length of the piston skirt, I have found the arrangement exemplified by Figs. 1 and 2 to be definitely preferable in most instances, since the rings are thereby protected against any excessive heat which may be present adjacent the piston head.

The present application, as amended, constitutes a continuation-in-part of my copending patent application Serial No. 5,450, filed January 30, 1948, and entitled "Piston and Piston Ring Assembly," which latter application is being abandoned in favor of the present one.

Whereas this invention is here illustrated and described with respect to particular preferred forms thereof, it should be understood that various changes may be made therein and various other forms may be constructed on the basis of the teaching hereof, by those skilled in the art, without departing from the protective scope of the following claims.

I claim:

1. In a piston for internal combustion engines, said piston having a head and a circumferential depending skirt open at its lower end, a series of annular receiving recesses formed externally in the lowermost portion of the skirt adjacent the open end thereof; piston ring carriers fitted within the respective receiving recesses; relatively soft, wick-type piston rings fitted into respective piston ring carriers; resilient expander rings backing said carriers; and oil-flow passages extending through the piston skirt and through said carriers and spaced circumferentially around said receiving recesses to establish oil-flow communication between said piston rings and the hollow interior of the piston, so as to conduct splash oil from the interior of the piston onto said piston rings.

2. The combination recited in claim 1, wherein the ring carriers are made up of a plurality of individual, arcuate segments.

3. The combination recited in claim 1, wherein the piston is somewhat elliptical transversely of its length, but the piston ring carrier is truly cylindrical.

4. A piston for internal combustion engines, comprising a piston skirt; a piston head closing one end of the piston skirt; a series of annular receiving recesses formed externally in said piston skirt adjacent the said open end thereof; a plurality of segmented piston ring carriers fitted into the respective receiving recesses, each of said carriers having an outer piston-ring-receiving channel and an inner oil-flow channel; resilient expander rings backing each of said ring carriers; relatively soft, wick-type piston rings fitted within the piston-ring-receiving channels of the respective carriers; and oil-flow passages spaced circumferentially around said receiving recesses and establishing flow communication between the said piston rings and the hollow interior of the piston, so as to conduct splash oil from the interior of the piston onto said piston rings.

5. The combination recited in claim 4, wherein each carrier segment comprises an outer piston-ring-receiving channel, and an inner oil-flow channel, the two channels being separated by a wall; and wherein the oil-flow passage means also include perforations formed at spaced intervals through said separating wall, and notches in the defining rims of the inner channel.

6. A piston ring, comprising an annular, rigid ring formed with an external, annular channel and with an internal annular channel, the two channels being separated by a wall; a series of openings extending at spaced intervals through and around said wall; a series of openings extending through an internal, channel-defining, rim wall; and a relatively soft, wick-type packing ring fitted into said external channel.

7. The combination recited in claim 6, wherein the rigid ring is made up of a plurality of individual arcuate segments.

8. An internal combustion engine piston and piston ring assembly, comprising a piston head; a skirt depending from said head; a plurality of longitudinally spaced, annularly channeled housings extending inwardly of said skirt, the channels thereof being open externally of the skirt; porous rings of packing material having lubricant diffusing properties substantially throughout the structures thereof positioned within the respective channels, and conduits for lubricant leading from the interior of said skirt directly into said channels.

9. The combination with an internal combustion engine piston having a piston head and skirt and a plurality of annular ring-receiving recesses defined externally of said piston skirt in spaced serial relationship longitudinally thereof, of a corresponding plurality of oil-absorbent piston rings positioned within the respective ring-receiving recesses; resilient expander rings backing said piston rings; and oil holes extending through the piston skirt at and spaced circumferentially around said ring-receiving recesses, so as to conduct splash oil from the interior of the piston onto said piston rings.

10. The combination recited in claim 9, wherein the piston skirt has its lowermost portion formed as a housing which projects into the hollow interior of the piston; wherein the annular ring-receiving recesses extend within said housing into registry with the hollow interior of the piston; and wherein the oil holes comprise sets of perforations extending through the upper wall of said housing down through the several webs between individual annular recesses.

11. The combination recited in claim 10, wherein the inner circumferential wall of the housing projects upwardly to define an oil retaining reservoir upon the top wall of the housing.

12. The combination recited in claim 11, wherein bored bosses project inwardly from opposite sides of the piston skirt, intermediate the length thereof and above the housing, as wrist pin bearings; and wherein a vaulted ceiling is provided across the entire hollow interior of the piston immediately above said bosses.

13. The combination recited in claim 9, wherein the ring-receiving recesses of said piston skirt are formed by respective annular housings which project inwardly of the piston skirt and have raised, circumferential edge portions within the piston, forming reservoirs for the collection of spray oil, at least some of said oil holes terminating within said reservoirs for conducting oil to the said piston rings.

14. In an internal combustion engine piston having a piston head and skirt, the combination of a circumferential ring-receiving recess formed externally in said piston skirt; an oil-absorbent piston ring positioned within said ring-receiving recess; a resilient expander ring backing said piston ring; and oil holes extending through the piston skirt at and spaced circumferentially around said ring-receiving recess, so as to conduct splash oil from the interior of the piston onto said piston ring.

15. The combination recited in claim 14, wherein the ring-receiving recess is defined in part by an annular housing which protrudes into the hollow interior of the piston; and wherein the upper wall of said housing is cupped as a reservoir for oil, said oil holes leading into said ring-receiving recess from said reservoir.

WILFRID HEUSSER.

References Cited in the file of this patent

UNITED STATES PATENTS

| Number | Name | Date |
|---|---|---|
| 1,092,834 | Haas | Apr. 14, 1914 |
| 1,251,906 | Moratta | Jan. 1, 1918 |
| 1,288,800 | Baker | Dec. 24, 1918 |
| 1,392,536 | Syfert | Oct. 4, 1921 |
| 1,495,773 | Brown | May 27, 1924 |
| 1,548,948 | Hirshfield | Aug. 11, 1925 |
| 1,735,291 | Moratta | Nov. 12, 1929 |
| 1,743,023 | Carter | Jan. 7, 1930 |
| 1,967,573 | Fox | July 24, 1934 |
| 2,154,342 | Marvin | Apr. 11, 1939 |
| 2,396,018 | Mis | Mar. 5, 1946 |
| 2,464,710 | Patterson | Mar. 15, 1949 |
| 2,466,252 | McFall | Apr. 5, 1949 |